United States Patent
Mesbah

(10) Patent No.: US 9,792,812 B1
(45) Date of Patent: *Oct. 17, 2017

(54) METHOD FOR CORRECTING ELECTRICITY METER READINGS

(71) Applicant: KING FAHD UNIVERSITY OF PETROLEUM AND MINERALS, Dhahran (SA)

(72) Inventor: Wessam Ali Mesbah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,357

(22) Filed: Jul. 27, 2017

Related U.S. Application Data

(63) Continuation of application No. 15/042,170, filed on Feb. 12, 2016, now Pat. No. 9,747,790.

(51) Int. Cl.
  *G08C 25/02* (2006.01)
  *G06Q 50/06* (2012.01)
  *H04L 1/00* (2006.01)
  *G08C 19/00* (2006.01)

(52) U.S. Cl.
  CPC ............ *G08C 25/02* (2013.01); *G06Q 50/06* (2013.01); *G08C 19/00* (2013.01); *H04L 1/0057* (2013.01)

(58) Field of Classification Search
  None
  See application file for complete search history.

(56) References Cited

U.S. PATENT DOCUMENTS

| | | | |
|---|---|---|---|
| 6,357,034 B1 | 3/2002 | Muller et al. | |
| 6,732,325 B1 * | 5/2004 | Tash | H03M 13/15 714/785 |
| 7,523,375 B2 * | 4/2009 | Spencer | H03M 13/1148 714/752 |
| 7,831,884 B2 * | 11/2010 | Spencer | H03M 13/09 714/755 |

(Continued)

OTHER PUBLICATIONS

Dinesh Auti, et al., "AC Power Line Carrier Communication", B.E.(Semester VIII), Electronics Engineering, http://www.awesomeweirdness.com/wp-content/uploads/2014/05/PLCC.pdf, 2011-2012, 84 pages.

(Continued)

*Primary Examiner* — Joseph Feild
*Assistant Examiner* — John Mortell
(74) *Attorney, Agent, or Firm* — Oblon, McClelland, Maier & Neustadt, L.L.P.

(57) ABSTRACT

A device, method, and computer-readable medium for correcting at least one error in readings of electricity meters, the method including receiving first readings of regular meters measuring electric energy delivered in each of a group of cables fed from a same distribution node in an electric grid during a period of time, receiving second readings of check meters measuring electric energy delivered in each of combinations of cables in the group of cables during the period of time, the combinations of cables being formed based on a redundant matrix in a generator matrix of a linear systematic block code, and correcting, in response to determining that at least one error been detected, the at least one error in the first readings of the regular meters and the second readings of the check meters.

9 Claims, 6 Drawing Sheets

(56) References Cited

U.S. PATENT DOCUMENTS

| | | | |
|---|---|---|---|
| 8,300,687 B1* | 10/2012 | Eliezer | G04R 20/10 |
| | | | 375/238 |
| 8,433,529 B2 | 4/2013 | Nakano et al. | |
| 8,756,481 B2* | 6/2014 | Ware | G11C 11/5621 |
| | | | 714/763 |
| 8,880,987 B2* | 11/2014 | Sharon | G06F 11/1012 |
| | | | 714/752 |
| 2009/0259917 A1 | 10/2009 | Spencer | |
| 2015/0134947 A1* | 5/2015 | Varcoe | H04L 9/0858 |
| | | | 713/150 |
| 2016/0285588 A1* | 9/2016 | Hald | H04Q 9/00 |

OTHER PUBLICATIONS

David P. Varodayan, et al., "Redundant Metering for Integrity with Information-Theoretic Confidentiality", Proc. IEEE SMARTGRIDCOMM., Oct. 2010, pp. 345-349.

Mustafa El-Halabi, et al., "A Distortion-Theoretic Perspective for Redundant Metering Security in a Smart Grid", $25^{th}$ IEEE Canadian Conference on Electrical and Computer Engineering (CCECE), 2012, 5 pages.

* cited by examiner

| Messages | Code words |
|---|---|
| (0 0 0 0) | (0 0 0 0 0 0 0) |
| (1 0 0 0) | (1 0 0 0 1 1 0) |
| (0 1 0 0) | (0 1 0 0 0 1 1) |
| (1 1 0 0) | (1 1 0 0 1 0 1) |
| (0 0 1 0) | (0 0 1 0 1 1 1) |
| (1 0 1 0) | (1 0 1 0 0 0 1) |
| (0 1 1 0) | (0 1 1 0 1 0 0) |
| (1 1 1 0) | (1 1 1 0 0 1 0) |
| (0 0 0 1) | (0 0 0 1 0 1 1) |
| (1 0 0 1) | (1 0 0 1 1 0 1) |
| (0 1 0 1) | (0 1 0 1 1 1 0) |
| (1 1 0 1) | (1 1 0 1 0 0 0) |
| (0 0 1 1) | (0 0 1 1 0 1 0) |
| (1 0 1 1) | (1 0 1 1 1 0 0) |
| (0 1 1 1) | (0 1 1 1 0 0 1) |
| (1 1 1 1) | (1 1 1 1 1 1 1) |

METHOD FOR CORRECTING ELECTRICITY METER READINGS

CROSS-REFERENCE TO RELATED APPLICATIONS

The present application is a continuation of Ser. No. 15/042,170, having a filing date of Feb. 12, 2016.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A smart grid is a modernized electric grid that uses various communication technologies to manage the electric grid in an automated fashion to improve the efficiency and reliability of the production and distribution of electricity. Smart grids provide a completely controllable and monitored network, where two-way communications between different elements of the grid and the control center are possible.

Electricity meters are used to monitor the electricity usage of different customers, both residential and industrial, and to provide billing information to customers as well as operators of the smart grids. Wrong readings of electricity meters can result from tampering or from malfunctioning of an electricity meter. These wrong readings of electricity meters can result in a huge financial loss to the electric utility companies. For example, customers can bring forth complaints against the electric utility companies and demand them to pay large penalties for the wrong readings of electricity meters. Thus, methods for detecting and correcting wrong readings of electricity meters are important for electric utility companies.

SUMMARY

Aspects of the disclosure provide a method, device, and computer-readable medium for correcting at least one error in readings of electricity meters. The method includes receiving first readings of regular meters measuring electric energy delivered in each of a group of cables fed from a same distribution node in an electric grid during a period of time, receiving second readings of check meters measuring electric energy delivered in each of combinations of cables in the group of cables during the period of time, the combinations of cables being formed based on a redundant matrix in a generator matrix of a linear systematic block code, and correcting, in response to determining that at least one error has been detected, the at least one error in the first readings and/or the second readings based on a syndrome vector of a reading vector that includes the first readings and the second readings, the syndrome vector of the reading vector being computed using a decoding matrix that is obtained by modifying a parity-check matrix of the linear systematic block code.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figures 1, 2:
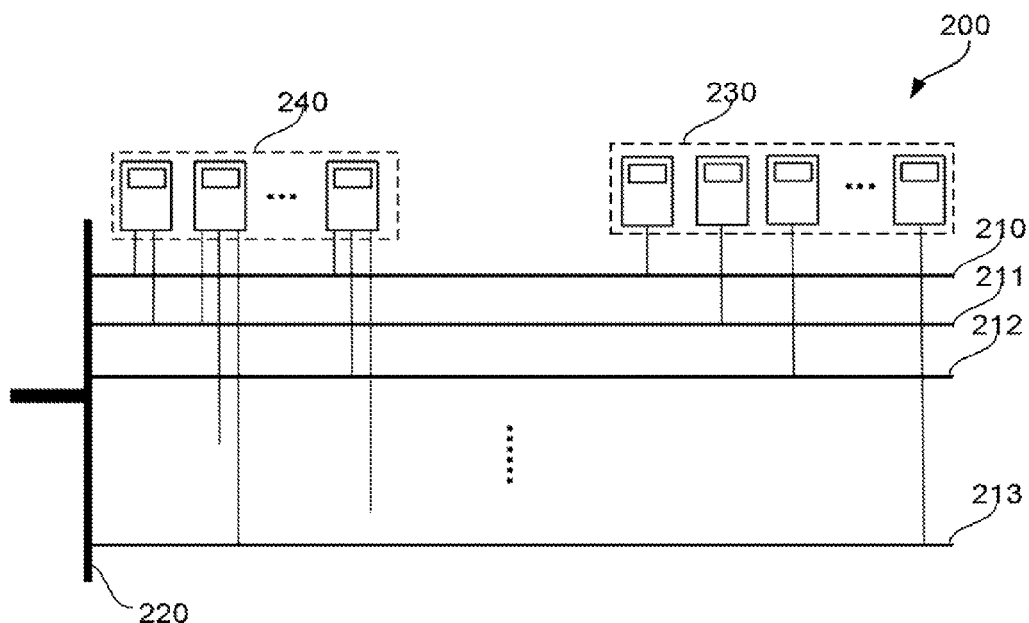
FIG. 1 shows an example of linear (K, N) code with N=4 and K=7.
FIG. 2 shows an electric energy transmission system according to some embodiments of the disclosure.

One method for detecting and correcting errors in readings of electricity meters is to use an additional electricity meter on a cable for electric energy transmission. This method is used by some electricity providers on the feeders directed to some high-load customers, e.g., industrial customers. However, this method is not efficient as it doubles the number of meters required. Moreover, if the readings of the two meters are different, an error can be detected, but cannot be corrected, due to the ambiguity that the error can happen at either of the two meters. The problem of ambiguity can be overcome by using three meters or more on each cable and deciding on the correct reading with the majority rule, but this would increase the number of meters required by a huge amount. Another method is to use a meter on the cable feeding a distribution node to measure a first sum of the power of all cables fed from the distribution node and compare the first sum with a second sum of the individual readings of the meters on the different cables. However, this method would again detect that an error exists but would not identify which meter is in error. In both methods discussed above, examination of all the meters is required in order to spot the malfunctioning meter.

A third method is to compare the current electricity usage profile of a customer with the customer's history, and try to guess that there is an error in the meter reading if the average reading is different from the average reading of the history. In this case, correction of the error is performed by estimating a correct reading from the history profile of the customer, and this must be agreed upon by both the electric utility company and the customer. However, as expected, this method can have inaccurate estimation and may cause a loss to both the electric utility company and the customer.

Aspects of the disclosure provide a method, device, and computer-readable medium for detecting and correcting errors in readings of a group of electricity meters. The group of electricity meters measure electric energy delivered by cables fed from the same distribution node. The errors might result from tampering, attacking or malfunctioning of the electricity meters. The method uses a coding scheme, and is based, with some modifications, on linear error-correcting block codes that are used in communication systems to detect and correct errors in data packets transmitted from a transmitter to a receiver.

The method includes receiving first readings of regular meters measuring electric energy delivered in each of a group of cables fed from a same distribution node in an electric grid during a period of time, receiving second readings of check meters measuring electric energy delivered in each of combinations of cables in the group of cables during the period of time, the combinations of cables being formed based on a redundant matrix in a generator matrix of a linear systematic block code, and correcting, in response to determining that at least one error has been detected, the at least one error in the first readings and/or the second readings based on a syndrome vector of a reading vector that includes the first readings and the second readings, the syndrome vector of the reading vector being computed using a decoding matrix that is obtained by modifying a parity-check matrix of the linear systematic block code.

In an embodiment, the first readings of the regular meters corresponds to parameters regarding usage of the electric energy delivered in each of the group of cables during the period of time, and the second readings of the check meters corresponds to parameters regarding usage of the electric energy delivered in each of combinations of cables in the group of cables during the period of time.

In an embodiment, the syndrome vector of the reading vector is computed by multiplying the reading vector with the decoding matrix.

In an embodiment, modifying the parity-check matrix includes multiplying elements of an identity matrix in the parity-check matrix with −1. In another embodiment, the decoding matrix is a modified decoding matrix, and modifying the parity-check matrix includes multiplying an element of an identity matrix in the parity-check matrix with −1, and scaling an element of the redundant matrix in the parity-check matrix using an estimated fraction of power loss in one of the group of cables with respect to total electric energy delivered in the one cable.

In an embodiment, the method further includes determining that no error has been detected when values of elements of the syndrome vector are within a predetermined range, the predetermined range being determined based on accuracy of estimation of the power losses on the group of cables. In an embodiment, in an embodiment, the correcting of the error in the first readings and the second readings based on the syndrome vector of a reading vector includes comparing the syndrome vector with rows in the decoding matrix to determine a position of a reading with the error in the reading vector, and subtracting a value of the error from the reading with the error, the value of the error being approximated using a value of an element in the syndrome vector that is not in the predetermined range.

In an embodiment, each of the combinations of cables corresponds to a column of the redundant matrix, each element in the column corresponding to one of the group of cables, and each of the combinations of cables includes cables corresponding to non-zero elements in the column of the redundant matrix.

Aspects of the disclosure provide a device for correcting at least one error in readings of electricity meters. The device includes circuitry that is configured to receive first readings of regular meters measuring electric energy delivered in each of a group of cables fed from a same distribution node in an electric grid during a period of time, receive second readings of check meters measuring electric energy delivered in each of combinations of cables in the group of cables during the period of time, the combinations of cables being formed based on a redundant matrix in a generator matrix of a linear systematic block code, and correct, in response to determining that at least one error has been detected, the at least one error in the first readings and the second readings based on a syndrome vector of a reading vector that includes the first readings and the second readings, the syndrome vector of the reading vector being computed using a decoding matrix that is obtained by modifying a parity-check matrix of the linear systematic block code.

Aspects of the disclosure provide a non-transitory computer-readable medium having computer-readable instructions stored thereon. The instructions, when executed by one or more computers, cause the one or more computers to perform a method for correcting at least one error in readings of electricity meters. The method includes receiving first readings of regular meters measuring electric energy delivered in each of a group of cables fed from a same distribution node in an electric grid during a period of time, receiving second readings of check meters measuring electric energy delivered in each of combinations of cables in the group of cables during the period of time, the combinations of cables being formed based on a redundant matrix in a generator matrix of a linear systematic block code, and correcting, in response to determining that at least one error has been detected, the at least one error in the first readings and the second readings based on a syndrome vector of a reading vector that includes the first readings and the second readings, the syndrome vector of the reading vector being computed using a decoding matrix that is obtained by modifying a parity-check matrix of the linear systematic block code.

Error detecting and correcting codes were originally developed for binary data transmission. The idea was to add redundant check bits to each block of information bits (such a block is referred to as an information block). These redundant check bits carry some designed characteristics of the information bits. At the receiver, the check bits are compared against the received information bits to determine whether there is an error. One of the very first codes was parity check code where a single bit was added to each block of information bits to indicate whether the information block contains an odd or even number of ones. This code helped in detecting an odd number of errors in a block of information bits, but could neither correct the error nor was it able to detect an even number of errors. Some other error detection codes also appeared at that time, such as two-out-of-five code and repetition code.

Generally, in data communications, an error detecting and correcting code is a system of rules to convert binary data into another form or representation for communication through a channel or storage in a medium. A block code is any member of error-correcting codes that encode data in blocks. A linear code is an error detecting and correcting code for which any linear combination of code words is also a code word. Linear codes can be partitioned into block codes and convolutional codes, although turbo codes can be seen as a hybrid of these two types. Examples of linear block codes are Reed-Solomon codes, Hamming codes, Hadamard codes, Expander codes, Golay codes, and Reed-Muller codes. Detailed description of error detecting and correcting codes can be found in the work of S. Lin and D. J. Costello, Error Control Coding: Fundamentals and Applications, Pearson Prentice Hall, 2014, incorporated herein by reference in its entirety.

Richard Hamming generalized the concept of two-out-of-five codes and developed what is currently known as Hamming codes. Geometrically speaking, Hamming codes are based on the idea of adding redundant check bits to each information block so as to generate different code words that are far from each other by a minimum Hamming distance $d_{min}=2n+1$, where the Hamming distance between any two code words refers to the number of different bits between these two code words, and n is the number of errors that that the code can correct. This minimum distance guarantees that there is a Hamming sphere surrounding each code word which contains all binary words that are at a distance less than or equal to n far from the code word. Therefore, this minimum distance guarantees that if errors occur to a maximum of n bits in any code word, the resulting binary word will still lie within the Hamming sphere of the original code word and will not cross the Hamming sphere of another code word, and hence upon receiving the erroneous code word, it is possible to correct the code word to the original code word.

From a mathematical point of view, the check bits can be used to detect errors in different bits by designing the code so that each single error would result in a different error shape in the check bits. For example, if M check bits are used, $2^M$ different binary combinations can be obtained which can be used to detect and correct single errors in $2^M-1$ positions. One is subtracted because one binary combination of the M check bits stands for no error case. Therefore, for an information block of length N augmented by M check bits, the following condition needs to be satisfied, $$N+M \leq 2^M-1, \quad (1)$$

or equivalently, $$N \leq 2^M-M-1, \quad (2)$$

in order to be able to detect and correct a single error in the code word.

One of the most famous binary Hamming codes is the (K, N)=(7,4) Hamming code, which is a single-error correcting code, where the length of each information block is N=4 and the length of the code word is K=7, and hence the number of check bits is M=3. These three check bits can correct a single error in any bit of $2^M-1=7$ bits of the code word.

An example of (7,4) Hamming code is defined by a generator matrix G shown as follows, $$G = [I_{4\times 4} \; H_{4\times 3}] = \begin{bmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{bmatrix}, \quad (3)$$

where $I_{4\times 4}$ is the identity matrix of size 4, and $H_{4\times 3}$ is a matrix of size 4×3. Each information block generated from a source includes four information bits which can be represented as a vector $u=[u_1 \; u_2 \; u_3 \; u_3]$, and each code word to be transmitted from the source to a destination includes seven bits which can be represented as a vector $v=[v_1 \; v_2 \; v_3 \; v_4 \; v_5 \; v_6 \; v_7]$. Accordingly, a code word can be generated using the following expression corresponding to an information block, $$v=u \cdot G. \quad (4)$$

The generated code word is sent by a transmitter from the source to a receiver at the destination through a communication channel. At the receiver, the received data block can be represented as $r=v+e$, where e is an error vector, which, for the case of a single error taking place in the transmission, contains all zeros except one bit being 1, and where the addition in this expression is modulo-2 addition. The modulo-2 addition defines the following rule of addition operations: 0+1=1, 0+0=0, and 1+1=0. Subsequently, the receiver uses a parity-check matrix PCH to detect whether there is an error in the received vector and the location of that error. Once the location of the error is known, the error can be corrected by inverting the bit at that location. The parity-check matrix PCH is orthogonal to the generator matrix G, and therefore takes the form of, $$PCH = [H_{4\times 3}^T \; I_{3\times 3}]^T = \begin{bmatrix} 1 & 1 & 0 \\ 1 & 0 & 0 \\ 0 & 1 & 1 \\ 1 & 1 & 1 \\ 1 & 0 & 0 \\ 1 & 0 & 0 \\ 0 & 1 & 0 \\ 0 & 0 & 1 \end{bmatrix}. \quad (5)$$

It can be seen that G·PCH=0, where 0 is a zero matrix of size 4×3.

If the received code word r is received correctly, i.e., r=v, and e is all zeros, then multiplying r by the parity-check matrix PCH results in, $$s=r \cdot PCH$$

$$=v \cdot PCH$$

$$=u \cdot G \cdot PCH$$

$$=u \cdot 0$$

$$=[0 \; 0 \; 0] \quad (6)$$

where s is called a syndrome vector which indicates whether there is an error or not and the location of that error. It can be seen that in case of no error, the syndrome vector s is all zeros. On the other hand, if the received code word has a single error, i.e., r=v+e, the syndrome vector s will be $$s=r \cdot PCH$$

$$=(u \cdot G+e) \cdot PCH$$

$$=e \cdot PCH \quad (7)$$

which is not zero and equals to one row of the parity-check matrix PCH. For example, if there is an error in the fourth bit of the code word, i.e., e=[0 0 0 1 0 0 0], this will result in the syndrome vector s being equal to the fourth row of the parity check matrix PCH. Since the rows of the parity-check matrix PCH are different, then when decoding a received data block r, by comparing the syndrome vector s to the rows of the matrix PCH, the location of the single error can be determined, and hence identify the error vector e. Once the error vector is identified, then the error can be corrected and the original code word v can be obtained from the received code word u and the error vector e as $$v=u+e \quad (8)$$

where the addition is modulo-2 addition.

The above encoding and decoding scheme for correcting errors in a communication channel with reference to Hamming code can be generalized to linear block codes. In block coding, a binary information sequence from an information source is segmented into message blocks of fixed length.

Each message block, denoted by u, consists of N information bits. An encoder transforms each input message block u into a binary K-tuple v with K>N according to certain rules. This binary K-tuple v is referred to as the code word of the message block u. Therefore, there are $2^N$ distinct messages corresponding to $2^N$ distinct code words, and the set of $2^N$ distinct code words is referred to as a block code. A block code of length K and $2^N$ code words is called a linear (K, N) code if and only if its $2^N$ code words form a N-dimensional subspace of the vector space of all the K-tuples over the field GF(2). FIG. 1 shows an example of linear (K, N) code with N=4 and K=7. In FIG. 1, the left column shows $2^N$=16 messages and the right column shows $2^N$=16 code words.

For a linear (K, N) code, a matrix G, referred to as a generator matrix, can be found such that the code word v corresponding to the message block u can be obtained through the following expression, $$v = u \cdot G, \quad (9)$$

where the generator matrix G has a size of N×K, and rows of the generator matrix G are N linearly independent code words found in the linear (K, N) code. For example, the linear (7, 4) code in FIG. 1 has the following matrix as a generator matrix, $$G = \begin{bmatrix} 1 & 0 & 0 & 0 & 1 & 1 & 0 \\ 0 & 1 & 0 & 0 & 0 & 1 & 1 \\ 0 & 0 & 1 & 0 & 1 & 1 & 1 \\ 0 & 0 & 0 & 1 & 1 & 0 & 1 \end{bmatrix}. \quad (10)$$

If u=[1 1 0 0] is the message to be encoded, its corresponding code word (as illustrated in FIG. 1) would be, $$v = u \cdot G \quad (11)$$
$$= [1\ 1\ 0\ 0] \cdot \begin{bmatrix} 1 & 0 & 0 & 0 & 1 & 1 & 0 \\ 0 & 1 & 0 & 0 & 0 & 1 & 1 \\ 0 & 0 & 1 & 0 & 1 & 1 & 1 \\ 0 & 0 & 0 & 1 & 1 & 0 & 1 \end{bmatrix}$$
$$= [1\ 1\ 0\ 0\ 1\ 0\ 1]$$

It is noted that the addition operations performed in the encoding or decoding process of a linear code are modulo-2 addition where 1+1=0.

In addition, for a linear (K, N) code having a generator matrix G, there exists a matrix PCH having a size of K×M where M=K−N, referred to as a parity-check matrix, corresponding to the generator matrix such that the following expressions hold, $$G \cdot PCH = 0, \quad (12)$$

$$v \cdot PCH = 0. \quad (13)$$

For example, a parity-check matrix of the linear (7, 4) code in FIG. 1 corresponding to the generator matrix G in expression (10) is, $$PCH = \begin{bmatrix} 1 & 1 & 0 \\ 0 & 1 & 1 \\ 1 & 1 & 1 \\ 1 & 0 & 1 \\ 1 & 0 & 0 \\ 0 & 1 & 0 \\ 0 & 0 & 1 \end{bmatrix}. \quad (14)$$

A linear block code can have a systematic structure as shown in FIG. 1, where a code word is divided into two parts, the message part and the redundant checking part. The message part consists of N unaltered information bits while the redundant checking part consists of M checking bits. A linear block code with such a structure is referred to as a linear systematic block code. A linear systematic (K, N) code is completely specified by a N×K generator matrix G of the following form, $$G = [I_{N \times N} H_{N \times M}], \quad (15)$$

where $I_{N \times N}$ denotes a K×K identity matrix, and $H_{N \times M}$, referred to as a redundant matrix in this disclosure, denotes the right part of the generator matrix G. Accordingly, if the generator matrix G of a linear (K, N) code is in the systematic form of expression (15), the parity-check matrix PCH may take the following form, $$PCH = \begin{bmatrix} H_{N \times M} \\ I_{M \times M} \end{bmatrix}, \quad (16)$$

where $I_{M \times M}$ denotes a M×M identity matrix. The generator matrix G given in (10) and the parity-check matrix PCH given in (14) are both in systematic forms.

After a code word v is transmitted over a noisy channel, a vector r can be received at the output of the channel, and the received vector r can be expressed as, $$r = v + e, \quad (17)$$

where e is a binary n-tuple and is referred to as an error vector or error pattern. The 1's in the error vector e are the transmission errors caused by the channel noise. Upon receiving r, a decoder at the receiver can first determine whether the received vector r contains transmission errors. If the presence of errors is detected, the decoder can take actions to locate and correct the errors.

In order to detect the errors, the decoder can compute the following M-tuple, $$s = r \cdot PCH, \quad (18)$$

where s is referred to as the syndrome of the received vector r. According to the expression (13), if r is a code word, then s=0, and if r is not a code word, then s≠0. Therefore, when s≠0, the presence of errors has been detected. However, when s=0, it is possible that the errors in certain received vectors are not detectable. For example, when the error pattern e is identical to a nonzero code word, r is the sum of two code words which is a code word, consequently, s=r·PCH=0.

The syndrome s computed from the received vector r depends only on the error pattern e, and not on the transmitted code word v, as shown below, $$s = r \cdot PCH = (v+e) \cdot PCH = v \cdot PCH + e \cdot PCH = e \cdot PCH. \quad (19)$$

Accordingly, because the parity-check matrix PCH is known to the decoder, according to computed syndrome s, when s≠0, it is possible to compute the error vector e. If the calculated error vector e is unique, the errors can be located and corrected; if the calculated error vector e is not unique, the errors cannot be corrected although the errors are detectable.

When an error takes place in a received vector, the receiver is able to determine the error vector and further correct the error. In an example, when an error takes place in a received vector, the error vector e will have only one element with a nonzero value. According to expression (19), the computed syndrome s will be a row of the parity-check matrix PCH. As rows in the parity-check matrix PCH are distinct from each other, the position of the row can be located based on the syndrome vector s, and subsequently the position of the element with a nonzero value in the error vector e can be determined. As a result, the error vector e is determined. Accordingly, the transmitted code word v can be computed using the following expression, $$v=r+e. \quad (20)$$

For example, for the linear (7, 4) code in FIG. 1 that has the parity-check matric PCH in (14), the code word v=[1 0 1 1 1 0 0] is transmitted and the received vector is r=[1 0 0 1 1 0 0] where the third bit has been corrupted. Upon receiving v, the receiver computes the syndrome, $$s = r \cdot PCH \quad (21)$$

$$= [1\ 0\ 0\ 1\ 1\ 0\ 0] \cdot \begin{bmatrix} 1 & 1 & 0 \\ 0 & 1 & 1 \\ 1 & 1 & 1 \\ 1 & 0 & 1 \\ 1 & 0 & 0 \\ 0 & 1 & 0 \\ 0 & 0 & 1 \end{bmatrix}$$

$$= [1\ 1\ 1].$$

The receiver can compare the syndrome vector [1 1 1] with the rows in the parity-check matrix PCH to determine that the third bit of the error vector e is 1 and the third bit of the received vector r has an error. Subsequently, the receiver can convert the third bit from of the received vector r to correct the error.

The minimum distance, denoted as $d_{min}$, of a linear code determines the error detecting and error correcting capabilities of the linear code. The minimum distance of a linear code is defined as the minimum Hamming distance between any two code words of the linear code, and Hamming distance is defined as the number of different places between two binary sequences that have the same length. A block code with minimum distance $d_{min}$ guarantees correcting all the error patterns of $t=[(d_{min}-1)/2]$ or fewer errors, where $[(d_{min}-1)/2]$ denotes the largest integer no greater than $(d_{min}-1)/2$. In addition, a block code with minimum distance $d_{min}$ guarantees detecting all the error patterns of $d_{min}-1$ or fewer errors. For example, the linear (7, 4) code given in FIG. 1 has a minimum distance 3. Thus t=1 and the linear (7, 4) code is capable of correcting any error pattern of a single error over a block of seven bits and detecting any error pattern of 2 errors over a block of seven bits.

Hamming codes are the first class of linear codes devised for error correction. For any positive integer M≥3, there exists a Hamming code with the following parameters, Code length: $K=2^M-1$;

Number of information bits: $N=2^M-M-1$;

Number of check bits: M=K-N

Error-correcting capability: $t=1(d_{min}=3)$.

The code in FIG. 1 is an example of Hamming codes with K=7 and N=4.

FIG. 2 shows an electric energy transmission system 200 according to some embodiments of the disclosure. The system 200 includes a plurality of cables 210-213 fed from a same bus 220 in a distribution node. The number of the plurality of cables 210-213 is denoted as N. The bus 220 and the N cables 210-213 can be made of any conductible materials suitable for electric energy transmission. The N cables 210-213 transmit electric energy from the bus 220 to equipment (not shown) that consumes electric energy or other electric energy transmission systems (not shown).

The N cables 210-213 can each have an electricity meter 230, referred to as a regular meter, that measures an amount of electric energy delivered by each of the N cables 210-213 during a period of time and give a reading, referred to as a regular reading, corresponding to the electric energy delivered. The amount of electric energy delivered by a cable i during the period of time is denoted as $p_i$, for i∈{1, 2, . . . , N}, and $p_i$ of all N cables can be represented as the vector $p=[p_1\ p_2\ \ldots\ p_N]$. The regular reading of the regular meter 230 corresponding to the cable i is denoted as $x_i$, for i∈{1, 2, . . . , N}. When all regular meters 230 are working properly, the regular reading $x_i$ is equal to the amount of electric energy $p_i$, thus $x_i=p_i$, for i∈{1, 2, . . . , N}.

In order to detect and correct errors in the readings of the regular meters 230 measuring electric energy delivered by N cables 210-213, a linear (K, N) systematic block code, denoted as C, is selected to be used, and additional electricity meters 240, referred to as check meters, are installed in the system 200.

The number of information bits in the code word of the linear code C is equal to N that is the number of the regular meters or the cables in the system 200. The code C has a generator matrix G and a parity check matrix PCH, taking the following form, respectively, $$G=[I_{N\times N} H_{N\times M}], \quad (22)$$

$$PCH = \begin{bmatrix} H_{N\times M} \\ I_{M\times M} \end{bmatrix}, \quad (23)$$

where $I_{N\times N}$ denotes a N×N identity matrix, $I_{M\times M}$ denotes a M×M identity matrix, and $H_{N\times M}$ denotes the redundant matrix of the generator matrix G. In an example, the number of the cables in the system 200 is equal to 4, thus N=4, and a (7, 4) Hamming code is used. The Hamming code has a generator matrix and a parity check matrix listed below, $$G = [I_{4\times 4}\ H_{4\times 3}] = \begin{bmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{bmatrix}, \quad (24)$$

$$PCH = \begin{bmatrix} H_{4\times 3} \\ I_{3\times 3} \end{bmatrix} = \begin{bmatrix} 1 & 1 & 0 \\ 1 & 0 & 1 \\ 0 & 1 & 1 \\ 1 & 1 & 1 \\ 1 & 0 & 0 \\ 0 & 1 & 0 \\ 0 & 0 & 1 \end{bmatrix}, \quad (25)$$

where the redundant matrix $H_{N\times M}$ takes the following form, $$H_{4\times 3} = \begin{bmatrix} 1 & 1 & 0 \\ 1 & 0 & 1 \\ 0 & 1 & 1 \\ 1 & 1 & 1 \end{bmatrix}. \quad (26)$$

The number of the check meters 240, denoted as M, is determined based on the code C. Specifically, the number of the check meters 240 is equal to the number of check bits of a code word of the code C, thus M=K−N. The reading of each check meter 240, referred to as a check reading, is denoted as $x_i$, for $i \in (N+1, N+2, \ldots, N+M)$. Each check meter 240 measures a sum of electric energy delivered by a selected combination of cables in the N cables based on the code C. The selected combination of cables is formed based on a column of the redundant matrix $H_{N\times M}$ of the code C. In other words, there are M check meters (or check readings) and there are M columns in the redundant matrix $H_{N\times M}$ of the code C; each check reading of the check meters 240 corresponds to a selected combination of cables that is formed based on each column of the redundant matrix $H_{N\times M}$. If all check meters are working properly and thus all check readings are correct, the check readings of the check meters 240, represented as a vector $c=[x_{N+1}\ x_{N+2}\ \ldots\ x_{N+M}]$, can be expressed as $$c = p \cdot H_{N\times M}. \quad (27)$$

For example, in the above example where the number of the cables 210-213 in the system 200 is equal to 4, and the (7, 4) Hamming code is used, the redundant matrix $H_{N\times M}$ takes the form of expression (26), and the number of the check meters 240 M is equal to 3. Thus, there are three check meters corresponding to three check readings $x_5$, $x_6$, and $x_7$. The first check meter measures a sum of electric energy delivered by a first selected combination of cables including cables 210, 211 and 213 corresponding to the nonzero elements in the first column of the redundant matrix $H_{N\times M}$ of expression (26); the second check meter measures a sum of electric energy delivered by a second selected combination of cables including cables 210, 212 and 213 corresponding to the nonzero elements in the second column of the redundant matrix $H_{N\times M}$ of expression (26); the third check meter measures a sum of electric energy delivered by a third selected combination of cables including cables 211, 212 and 213 corresponding to the nonzero elements in the third column of the redundant matrix $H_{N\times M}$ of expression (26).

After the regular readings and the check readings are obtained, the regular readings and the check readings together form a vector $x=[x_1\ x_2\ \ldots\ x_{N+M}]$, referred to as a reading vector. For the situation that all readings are correct, the reading vector can be denoted as $x_c$. Based on the above description, the vector $x_c$ can be expressed as, $$x_c = p \cdot G. \quad (28)$$

For the situation that there are errors with the readings, either check readings or regular readings, the reading vector can be denoted as $\hat{x}$, and can be expressed as $$\hat{x} = x_c + e, \quad (29)$$

where e is an error vector, represented as $e=[e_1\ e_2\ \ldots\ e_{N+M}]$, each element $e_i$ of which represents an error corresponding to the reading $x_i$.

After the reading vector $x=[x_1\ x_2\ \ldots\ x_{N+M}]$ is obtained, in order to detect and correct the errors in the readings of the electricity meters, a process of decoding the reading vector x can be performed.

The first step of the decoding process is to detect the errors by computing a syndrome vector s of the reading vector x using a decoding matrix D. The process of computing the syndrome vector s of the reading vector x is similar to the process of computing a syndrome vector in a communication system using a linear systematic block code described above, however, the decoding matrix D used for decoding the reading vector x is different from the parity-check matrix PCH of expression (23) used for decoding in a communication system. The reason for the difference is that in the communication system, binary vectors are used and modulo-2 operation is applied, while when decoding the reading vector x, the readings in the reading vector x are not binary but real numbers. As a result, the decoding matrix D takes a form of a modified parity-check matrix PCH as shown below, $$D = \begin{bmatrix} H_{N\times M} \\ -I_{M\times M} \end{bmatrix}. \quad (30)$$

Compared with the parity-check matrix PCH in (23), the decoding matrix D is the same as the parity-check matrix PCH in (23) except that the identity matrix $I_{M\times M}$ is multiplied by a−1. It can be seen that G·D=0 where regular addition operation is applied. In the example above where the (7, 4) Hamming code is used, an example of the decoding matrix D can be expressed as, $$D = \begin{bmatrix} H_{4\times 3} \\ -I_{3\times 3} \end{bmatrix} = \begin{bmatrix} 1 & 1 & 0 \\ 1 & 0 & 1 \\ 0 & 1 & 1 \\ 1 & 1 & 1 \\ -1 & 0 & 0 \\ 0 & -1 & 0 \\ 0 & 0 & -1 \end{bmatrix}. \quad (31)$$

To compute a syndrome vector s of the reading vector x using a decoding matrix D, the reading vector x is multiplied by the decoding matrix D as shown below, $$s = x \cdot D. \quad (32)$$

For the case of no errors in the readings, the syndrome vector s will be zero, as shown below, $$s = x \cdot D = x_c \cdot D = p \cdot G \cdot D = 0. \quad (33)$$

For the case that errors take place, the syndrome vector s will be nonzero, as shown below, $$s = x \cdot D = \hat{x} \cdot D = (x_c + e) \cdot D = e \cdot D. \quad (34)$$

Therefore, if the computed syndrome vector s is equal to zero, no errors are detected; otherwise, errors are detected.

In case that only a single error is possible to take place in readings of the checking meters and regular meters, the syndrome vector s equal to zero means that there is no error in the readings. For cases that multiple errors take place, when the computed syndrome vector s is equal to zero, it is possible that undetectable errors exist.

When errors are detected, the second step of the decoding process is to locate and correct the errors. In an example, a single error takes place in readings of the checking meters or regular meters, and according to expression (34), the computed syndrome vector s is equal to one row of the decoding matrix D scaled by the value of the error. For example, in the above example where the Hamming (7, 4) code is used, the decoding matrix D takes the form of expression (31), and if there is a single error of $e_3$ in the reading of the third meter, e.g., $e = [0\ 0\ e_3\ 0\ 0\ 0]$, the syndrome vector will be, $$s = e \cdot D \quad (35)$$

$$= [0\ 0\ e_3\ 0\ 0\ 0\ 0] \cdot \begin{bmatrix} 1 & 1 & 0 \\ 1 & 0 & 1 \\ 0 & 1 & 1 \\ 1 & 1 & 1 \\ -1 & 0 & 0 \\ 0 & -1 & 0 \\ 0 & 0 & -1 \end{bmatrix} =$$

$$[0\ e_3\ e_3].$$

It is noted that the value of the error $e_3$ can be positive or negative and will appear in the syndrome vector with its sign. By comparing the positions of the zeros of the syndrome vector to the positions of the zeros in the rows of the decoding matrix D, both the error location and the error value can be found. Subsequently, the single error can be corrected by subtracting the error value from the reading of the malfunctioning meter, and the correct value of the malfunctioning meter can be obtained.

As can be seen in the above example where the Hamming (7, 4) code is used, the coding scheme described above is not efficient for scenarios where an electric energy transmission system includes only four cables, and the number of additional check meters, total of three, is very close to the number of the regular meters. In communication systems, a parameter called code rate is defined to quantify the efficiency of a code. The code rate is defined as N/K for a linear (K, N) code. As the code rate approaches 1, the code becomes more efficient. In the case of the Hamming (7,4) code, the code rate is N/K=4/7=0.571 which is considered to be inefficient. However, as shown in the expression (2), using a number of check meters M can serve a number of cables $N=2^M-M-1$, which renders the code rate N/K=

$$\frac{2^M - M - 1}{2^M - 1}.$$

It can be seen that by increasing the number of check meters M, the code rate approaches 1. For example, using M=5 can serve a number of cables of N=26 giving a code rate of N/K=26/31=0.8387. Increasing M increases the code rate resulting in a more efficient coding scheme.

It is noted that the above description of the coding scheme does not consider power losses in the cables 210-213 in the electricity energy transmission system 200 in FIG. 2. The coding scheme considering power losses is described below.

Typically, in the FIG. 2 example, there is a distance between the place where the regular meters 230 are installed and the place where the check meters 240 are installed. For example, the regular meters 230 can be installed at places close to customers or other transmission systems or equipment in an electric energy distribution system, while the check meters 240 can be installed at places close to the distribution node 220, such as at a transformer. Thus, it is possible for the current transformers in the check meters to surround different groups of cables. Accordingly, differences in the readings between the regular meters 230 and the check meters 240 will occur due to the power losses in the cables 210-213, which will appear as if there is a multiple-error case, although all the meters 230 and 240 might be reading correctly. Subsequently, the syndrome vector computed can give wrong results and the coding scheme cannot be workable. In the above example where the Hamming (7, 4) code is used, considering the power losses, the readings of the meters 230 and 240 in case of all of the meters 230 and 240 working properly can be expressed as follows, $$x_c = p \cdot \tilde{G} \quad (36)$$

$$= [p_1\ p_2\ p_3\ p_4] \cdot$$

$$\begin{bmatrix} 1-\delta_1 & 0 & 0 & 0 & 1 & 1 & 0 \\ 0 & 1-\delta_2 & 0 & 0 & 1 & 0 & 1 \\ 0 & 0 & 1-\delta_3 & 0 & 0 & 1 & 1 \\ 0 & 0 & 0 & 1-\delta_4 & 1 & 1 & 1 \end{bmatrix} = \begin{bmatrix} (1-\delta_1)p_1 \\ (1-\delta_2)p_2 \\ (1-\delta_3)p_3 \\ (1-\delta_4)p_4 \\ p_1+p_2+p_4 \\ p_1+p_3+p_4 \\ p_2+p_3+p_4 \end{bmatrix},$$

where $x_c$ is the reading vector in case of all meters 230 and 240 working properly, the vector p represents the actual electric energy delivered by the cables 210-213 at the distribution node, the matrix $\tilde{G}$, referred to as a modified generator matrix, can be obtained by modifying the generator matrix G of expression (24), and $\delta_i$ for $i \in \{1, 2, 3, 4\}$ represents the actual fraction of power losses in cable i with respect to the total electric energy delivered on the cable i. When decoding the reading vector $x_c$ of expression (36), the syndrome vector s can be computed as follows, $$s = x_c \cdot D \quad (37)$$

$$= \begin{bmatrix} (1-\delta_1)p_1 \\ (1-\delta_2)p_2 \\ (1-\delta_3)p_3 \\ (1-\delta_4)p_4 \\ p_1+p_2+p_4 \\ p_1+p_3+p_4 \\ p_2+p_3+p_4 \end{bmatrix}^T \cdot \begin{bmatrix} 1 & 1 & 0 \\ 1 & 0 & 1 \\ 0 & 1 & 1 \\ 1 & 1 & 1 \\ -1 & 0 & 0 \\ 0 & -1 & 0 \\ 0 & 0 & -1 \end{bmatrix} =$$

$$\begin{bmatrix} -\delta_1 p_1 - \delta_2 p_2 - \delta_4 p_4 \\ -\delta_1 p_1 - \delta_3 p_3 - \delta_4 p_4 \\ -\delta_2 p_2 - \delta_3 p_3 - \delta_4 p_4 \end{bmatrix}^T,$$

where the decoding matrix D of expression (31) is used. The syndrome vector s indicates incorrectly that one or more meters are reading incorrectly, although all of the meters 230 and 240 are reading correctly. This results from the fact that $\bar{G}\cdot D \neq 0$ because of the power losses in the cables 210-230.

To solve the problem with the power losses in the cables described above, a modified decoding matrix, denoted as $\tilde{D}$, is used for decoding the reading vector s. Specifically, the power losses in each cable as a percentage of the total energy delivered by that cable is first estimated, e.g., based on the length, materials, etc. of that cable. Then, the decoding matrix D is modified to be a modified decoding matrix $\tilde{D}$ based on the estimation to compensate for the power losses. For example, in the example above where the Hemming (7,4) code is used, the estimated fractions of the energy losses in cables 210-213 with respect to the total delivered energy by those cables can be denoted as $\hat{\delta}_1$, $\hat{\delta}_2$, $\hat{\delta}_3$, and $\hat{\delta}_4$, respectively. Then the readings of the regular meters $x_1$, $x_2$, $x_3$, and $x_4$ can be scaled as, $$\frac{1}{1-\hat{\delta}_1}x_1,$$

$$\frac{1}{1-\hat{\delta}_2}x_2,$$

$$\frac{1}{1-\hat{\delta}_3}x_3,$$

and $$\frac{1}{1-\hat{\delta}_4}x_4,$$

respectively, before they can be compared with the readings of the check meters. Therefore, the decoding matrix D in (31) may be modified as $$\tilde{D} = \begin{bmatrix} \frac{1}{1-\hat{\delta}_1} & \frac{1}{1-\hat{\delta}_1} & 0 \\ \frac{1}{1-\hat{\delta}_2} & 0 & \frac{1}{1-\hat{\delta}_2} \\ 0 & \frac{1}{1-\hat{\delta}_3} & \frac{1}{1-\hat{\delta}_3} \\ \frac{1}{1-\hat{\delta}_4} & \frac{1}{1-\hat{\delta}_4} & \frac{1}{1-\hat{\delta}_4} \\ -1 & 0 & 0 \\ 0 & -1 & 0 \\ 0 & 0 & -1 \end{bmatrix}. \quad (38)$$

Generally, the modified decoding matrix $\tilde{D}$ can be obtained by scaling each element of the redundant matrix $H_{N \times M}$ in the decoding matrix D of expression (30) using estimated fractions of power losses in the cables with respect to the total delivered energy by those cables.

The modified decoding matrix $\tilde{D}$ in (38) does not guarantee that the syndrome vector of the reading vector $x_c$ is going to be all zeros in case of all meters reading correctly, since the modification of the decoding matrix G is based on an estimation of the power losses and not on the actual power losses. However, the modified decoding matrix $\tilde{D}$ in (38) is able to reduce the values of the syndrome vector to a very small value that is close to zero (depending on the accuracy of the power losses estimation) when all meters are reading correctly. The syndrome vector, in this case, can be computed as follows, $$s = x_c \cdot \tilde{D} \quad (39)$$

$$= \begin{bmatrix} (1-\delta_1)p_1 \\ (1-\delta_2)p_2 \\ (1-\delta_3)p_3 \\ (1-\delta_4)p_4 \\ p_1+p_2+p_4 \\ p_1+p_3+p_4 \\ p_2+p_3+p_4 \end{bmatrix}^T \begin{bmatrix} \frac{1}{1-\hat{\delta}_1} & \frac{1}{1-\hat{\delta}_1} & 0 \\ \frac{1}{1-\hat{\delta}_2} & 0 & \frac{1}{1-\hat{\delta}_2} \\ 0 & \frac{1}{1-\hat{\delta}_3} & \frac{1}{1-\hat{\delta}_3} \\ \frac{1}{1-\hat{\delta}_4} & \frac{1}{1-\hat{\delta}_4} & \frac{1}{1-\hat{\delta}_4} \\ -1 & 0 & 0 \\ 0 & -1 & 0 \\ 0 & 0 & -1 \end{bmatrix} =$$

$$\begin{bmatrix} \frac{\hat{\delta}_1-\delta_1}{1-\hat{\delta}_1}p_1 + \frac{\hat{\delta}_2-\delta_2}{1-\hat{\delta}_2}p_2 + \frac{\hat{\delta}_4-\delta_4}{1-\hat{\delta}_4}p_4 \\ \frac{\hat{\delta}_1-\delta_1}{1-\hat{\delta}_1}p_1 + \frac{\hat{\delta}_3-\delta_3}{1-\hat{\delta}_3}p_3 + \frac{\hat{\delta}_4-\delta_4}{1-\hat{\delta}_4}p_4 \\ \frac{\hat{\delta}_2-\delta_2}{1-\hat{\delta}_2}p_2 + \frac{\hat{\delta}_3-\delta_3}{1-\hat{\delta}_3}p_3 + \frac{\hat{\delta}_4-\delta_4}{1-\hat{\delta}_4}p_4 \end{bmatrix}^T.$$

It can be seen from (38) that if the estimation of the power losses is correct, i.e., $\hat{\delta}_i = \delta_i$, for $i \in \{1, 2, 3, 4\}$, then the syndrome vector will have all zero elements. These estimations of the power losses can be examined in the beginning while installing the energy transmission system 200 until the correct values of the losses are obtained and the syndrome vector is a zero vector when all the meters are reading correctly. When changes in the physical characteristics of the cable take place later, the estimation can still be very close to the actual losses.

If the estimation of the power losses is not exactly equal to the actual losses, this will result in a syndrome vector with very small elements; the values of the elements depend on the accuracy of the estimation. As an example, if the actual fraction of energy loss in all the cables is 1.8% and is estimated to be 2%, then the syndrome vector will be $$s = \begin{bmatrix} 0.00204(p_1+p_2+p_4) \\ 0.00204(p_1+p_3+p_4) \\ 0.00204(p_2+p_3+p_4) \end{bmatrix}^T. \quad (40)$$

On the other hand, in case there is an error in the reading of one of the meters 230 and 240, this error will be magnified in the syndrome vector. For example, in the above example where the Hamming (7, 4) code is used, and if there is an error of $e_3$ in the reading of the third meter, e.g., $e=[0\ 0\ e_3\ 0\ 0\ 0\ 0]$, the syndrome vector will be, $$s = \hat{x} \cdot \tilde{D} \quad (41)$$

$$= (x_c + e) \cdot \tilde{D}$$

-continued $$= x_c \cdot \tilde{D} + e \cdot \tilde{D}$$

$$= \begin{bmatrix} \frac{\hat{\delta}_1 - \delta_1}{1 - \hat{\delta}_1} p_1 + \frac{\hat{\delta}_2 - \delta_2}{1 - \hat{\delta}_2} p_2 + \frac{\hat{\delta}_4 - \delta_4}{1 - \hat{\delta}_4} p_4 \\ \frac{\hat{\delta}_1 - \delta_1}{1 - \hat{\delta}_1} p_1 + \frac{\hat{\delta}_3 - \delta_3}{1 - \hat{\delta}_3} p_3 + \frac{\hat{\delta}_4 - \delta_4}{1 - \hat{\delta}_4} p_4 + \frac{1}{1 - \hat{\delta}_3} e_3 \\ \frac{\hat{\delta}_2 - \delta_2}{1 - \hat{\delta}_2} p_2 + \frac{\hat{\delta}_3 - \delta_3}{1 - \hat{\delta}_3} p_3 + \frac{\hat{\delta}_4 - \delta_4}{1 - \hat{\delta}_4} p_4 + \frac{1}{1 - \hat{\delta}_3} e_3 \end{bmatrix}^T,$$

where elements with the error $e_3$ are usually larger than other elements. Therefore, in order to determine whether there is a meter with an incorrect reading, the elements of the syndrome vector s that lie within a small range around zero, e.g., $\epsilon \geq s_i \geq -\epsilon$, can be approximated to zero. The range, $\epsilon$, is determined based on the expected accuracy of the estimation of the power losses. Once the above values are approximated to zero, the remaining non-zero elements and their position in the syndrome vector can be used to determine which meter has an error and the approximate value of the error.

In various embodiments, a predetermined range can be used for determination of whether there is a meter with an incorrect reading. The predetermined range is determined based on an expected accuracy of the estimation of the power losses in cables with meters whose readings are monitored using the coding scheme. In the example presented by expression (40), the predetermined range can be from –6 kilowatt-hour (kWh) to +6 kWh. This predetermined range corresponds to the amount of electric energy delivered by each cable being in a range of 1000 kWh in the example represented by expression (40). When all the elements of the syndrome vector s lie within the predetermined range, it is determined that there are no errors in the reading vector.

Although the coding scheme considering power losses in cables described above uses the Hamming (7, 4) code, the scope of the disclosure is not limited to the Hamming (7, 4) code, and the coding scheme considering power losses can be applied to other linear systematic block codes used for detecting and correcting errors in readings of electricity meters.

Two exemplary linear systematic block codes capable of correcting multiple errors are described below. Generally, designing a code that is capable of directly finding the locations and values of multiple errors can be done by increasing the number of check bits to cover all the different combinations of errors. Specifically, for N regular meters and M check meters, in order to be able to correct up to T terrors, M must satisfy the following inequality, known as Hamming bound, $$2^M \geq \sum_{i=0}^{i=T} \binom{N+M}{i}, \quad (42)$$

where $$\binom{N+M}{i}$$

represents the number of all combinations of i errors, for $i \in 0, 1, 2, \ldots, T$. In case of codes capable of correcting up to two-errors, i.e., T=2 in (42), the Hamming bound can be simplified to a simple relation between the number of regular meters N and the number of check meters M, as $$N \leq -M + \sqrt{2^M - 1}.$$

A code that satisfies the Hamming bound in expression (42) with equality is called a perfect code. A perfect code also means that the Hamming spheres around each code word not only are non-overlapping but they also exhaust all the 2 K possible binary words of length K. The Hamming sphere around each code word is the binary words of length N that lie within a Hamming distance t from the code word.

In the work of S. Lin and D. J. Costello, Error Control Coding: Fundamentals and Applications, Pearson Prentice Hall, 2014, several codes have been developed to detect and correct multiple errors. The application of correcting errors in readings of electricity meters requires the original code to be binary so that the measurements are just the sum of energies delivered by a group of cables. Some binary codes used to detect and correct multiple errors are Reed-Muller (RM) codes, Golay code, and binary BCH codes.

In general, these codes, except for Golay code, are not systematic. Although non-systematic codes can be transformed into systematic codes, being non-systematic allows the use of low complexity decoding algorithms without having to store large syndrome tables. Converting the codes into systematic codes has the disadvantage of losing the code structure that allows low complexity decoding process, which might cause delay problems especially in applications related to high speed data transmission over a communication channel. However, correcting errors in electricity meters is not delay-limited, and hence the decoding complexity that results from converting the codes into systematic codes will not affect the operation of the proposed system.

On the other hand, although the application of detecting and correcting errors in the readings of smart meter can work well with non-systematic codes, the practical implementation would be easier and less expensive with systematic codes. This is due to the fact that in systematic codes, due to the identity matrix, most of the meters will be regular meters to measure the energy delivered by only one cable, while with non-systematic codes, all the meters will be check meters. Therefore, transforming these codes into systematic codes may be needed, which can be done by row and column operations on the code generating matrices. Shown below are an example of (23, 12) Golay code as a systematic code and another example of a Reed-Muller code as a non-systematic code that can be converted into a systematic code.

A (23, 12) Golay code is a three-error correcting perfect code. The minimum distance of the (23, 12) Golay code was shown to be 7. Being perfect means that the (23, 12) Golay code satisfies the Hamming bound in (42) with equality. As can be seen, the (23, 12) Golay code has a code length of K=23, data length of N=12, and the number of check bits is M=11. Besides the hamming code, the (23, 12) Golay code is the only known perfect code. The (23, 12) Golay code can be extended to (24, 12) Golay code by adding an overall parity check bit. In this case the (24, 12) Golay code is no longer a perfect code and has a minimum distance of 8, which can be used to correct up to three errors and detect error patterns with four errors.

The (24, 12) Golay code generator matrix takes the same structure of a systematic linear block code, and so does the decoding matrix. Therefore, in the application of correcting errors in readings of electricity meters, when the (24, 12) Golay code is used, the same steps described above for the Hamming code example are performed. For example, the steps of using the (24, 12) Golay code for correcting errors in readings of electricity meters can include receiving the reading vector of the regular meters and check meters, calculating a syndrome vector of the reading vectors by multiplying the reading vectors with a decoding matrix that is a modified parity-check matrix of the (24, 12) Golay code, using the syndrome vector to decide an error vector, and subsequently correcting the errors. However, in one example, in order to decide an error vector, a syndrome lookup table is used. The syndrome lookup table will be of a larger size in order to cover all the cases of multiple errors up to three errors. A syndrome lookup table represents mapping relationship between syndrome vectors and error vectors indicating error patterns. By using the syndrome lookup table, when a syndrome vector is calculated, a corresponding error vector can be found accordingly.

In another example, because the structure of the (24, 12) Golay code allows the use of a lower complexity decoding algorithm in the binary case, the lookup table is not used. The decoding algorithm is introduced in the fourth chapter of the work of S. Lin and D. J. Costello, Error Control Coding: Fundamentals and Applications, Pearson Prentice Hall, 2014. This algorithm can be used by first converting the syndrome vector to a binary vector by leaving any zero value (small value in case of energy losses) as zero and converting any nonzero value into one, then using the decoding algorithm to determine the locations of the errors, and finally using the values of the original syndrome vector to correct the errors.

Reed-Muller (RM) codes were first discovered by David E. Muller in 1954, while the first majority-logic decoding algorithm for these codes was devised by Irwin S. Reed in the same year. RM codes are defined in terms of two integer parameters m and r, where $0 \leq r \leq m$. RM(r, m) is a code that has a length $K=2^m$, minimum distance $d_{min}=2^{m-r}$, and data length $$m = 1 + \binom{m}{1} + \binom{m}{2} + \ldots + \binom{m}{r}.$$

The structure of the RM codes allows the use of the low computational complexity majority-logic decoding algorithm. This code structure is not systematic, and after transforming the code structure into a systematic structure, it may not be possible to use the majority-logic decoding algorithm, and it may be needed to use lookup tables with higher computational complexity.

However, convening the RM codes into a systematic form has the advantage of having most of the meters be regular meters (capable of measuring the energy in one cable), while a few meters be check meters (capable of measuring the sum of energies in a group of cables). This can reduce the cost and the complexity of the physical connections. In the application of correcting errors in readings of electricity meters, computational complexity is not a critical issue since the application of detecting and correcting errors in smart meters is not delay limited. Therefore, it may be needed to transform the RM codes into a systematic form.

Here one example of Reed-Muller codes, RM(2, 5) is shown. This code has a length of K=32, data length of N=16, and minimum distance of dmin=8, and hence this code is capable of correcting up to three simultaneous errors in the readings of 32 meters. The generator matrix of such a code can be written as below.

$$G = \begin{pmatrix} 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 & 1 \\ 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 \\ 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 1 & 1 & 1 & 1 & 1 & 1 & 1 & 1 & 0 & 0 & 0 & 0 & 0 & 0 & 0 & 0 & 1 & 1 & 1 & 1 & 1 & 1 & 1 & 1 \\ 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 & 1 & 1 & 1 & 1 & 1 & 1 & 1 & 1 & 1 \\ 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 & 0 & 0 & 0 & 1 & 0 \\ 0 & 0 & 0 & 0 & 1 & 0 & 1 & 0 & 0 & 0 & 0 & 0 & 1 & 0 & 1 & 0 & 0 & 0 & 0 & 0 & 1 & 0 & 1 & 0 & 0 & 0 & 0 & 0 & 1 & 0 & 1 & 0 \\ 0 & 0 & 0 & 0 & 0 & 0 & 0 & 1 & 0 & 1 & 0 & 1 & 0 & 1 & 0 & 0 & 0 & 0 & 0 & 0 & 0 & 0 & 0 & 1 & 0 & 1 & 0 & 1 & 0 & 1 & 0 \\ 0 & 0 & 0 & 0 & 0 & 0 & 0 & 0 & 0 & 0 & 0 & 0 & 0 & 0 & 0 & 1 & 0 & 1 & 0 & 1 & 0 & 1 & 0 & 1 & 0 & 1 & 0 & 1 & 0 & 1 & 0 \\ 0 & 0 & 0 & 0 & 0 & 1 & 1 & 0 & 0 & 0 & 0 & 0 & 0 & 1 & 1 & 0 & 0 & 0 & 0 & 0 & 1 & 1 & 0 & 0 & 0 & 0 & 0 & 0 & 1 & 1 \\ 0 & 0 & 0 & 0 & 0 & 0 & 0 & 0 & 0 & 1 & 1 & 0 & 0 & 1 & 1 & 0 & 0 & 0 & 0 & 0 & 0 & 0 & 0 & 0 & 1 & 1 & 0 & 0 & 1 & 1 \\ 0 & 0 & 0 & 0 & 0 & 0 & 0 & 0 & 0 & 0 & 0 & 0 & 0 & 0 & 0 & 0 & 0 & 1 & 1 & 0 & 0 & 1 & 1 & 0 & 0 & 1 & 1 & 0 & 0 & 1 & 1 \\ 0 & 0 & 0 & 0 & 0 & 0 & 0 & 1 & 1 & 1 & 1 & 0 & 0 & 0 & 0 & 0 & 0 & 0 & 0 & 0 & 0 & 0 & 0 & 0 & 0 & 1 & 1 & 1 & 1 \\ 0 & 0 & 0 & 0 & 0 & 0 & 0 & 0 & 0 & 0 & 0 & 0 & 0 & 0 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 \end{pmatrix}$$

Using column and row operations, the generator matrix of such a code can be transformed into a systematic generator matrix G=[I H], where the matrix H is shown below.

$$H = \begin{pmatrix} 1 & 1 & 1 & 1 & 0 & 1 & 0 & 1 & 1 & 1 & 1 & 0 & 0 & 0 & 1 \\ 0 & 1 & 1 & 1 & 1 & 0 & 1 & 0 & 1 & 1 & 1 & 1 & 0 & 0 & 1 \\ 0 & 0 & 1 & 1 & 1 & 1 & 0 & 1 & 0 & 1 & 1 & 1 & 1 & 0 & 1 \\ 0 & 0 & 0 & 1 & 1 & 1 & 1 & 0 & 1 & 0 & 1 & 1 & 1 & 1 & 1 \\ 1 & 1 & 1 & 1 & 1 & 0 & 1 & 0 & 1 & 0 & 1 & 0 & 1 & 1 & 0 \\ 1 & 0 & 0 & 0 & 1 & 0 & 0 & 0 & 1 & 0 & 1 & 0 & 0 & 1 & 1 & 1 \\ 1 & 0 & 1 & 1 & 0 & 0 & 0 & 1 & 1 & 0 & 1 & 0 & 0 & 0 & 1 & 0 \\ 1 & 0 & 1 & 0 & 1 & 1 & 0 & 1 & 0 & 0 & 1 & 0 & 0 & 0 & 1 \\ 0 & 1 & 0 & 1 & 0 & 1 & 1 & 0 & 1 & 0 & 0 & 1 & 0 & 0 & 1 \\ 0 & 0 & 1 & 0 & 1 & 0 & 1 & 1 & 0 & 1 & 0 & 0 & 1 & 0 & 1 \\ 0 & 0 & 0 & 1 & 0 & 1 & 0 & 1 & 1 & 0 & 1 & 0 & 0 & 1 & 1 \\ 1 & 1 & 1 & 1 & 0 & 0 & 0 & 0 & 1 & 0 & 0 & 1 & 1 & 0 & 0 \\ 0 & 1 & 1 & 1 & 1 & 0 & 0 & 0 & 0 & 1 & 0 & 0 & 1 & 1 & 0 \\ 0 & 0 & 1 & 1 & 1 & 1 & 0 & 0 & 0 & 0 & 1 & 0 & 0 & 1 & 1 & 0 \\ 1 & 1 & 1 & 0 & 1 & 0 & 1 & 1 & 1 & 1 & 0 & 0 & 0 & 1 & 1 \end{pmatrix}$$

In addition, for the purpose of detecting and correcting errors in the readings of the electricity meters, the decoding matrix should be written as $D=[H^T-I]^T$. In the application of correcting errors in readings of electricity meters, when the RM codes are used, the similar steps described above for the Hamming code example are performed. For example, the steps of using RM codes for correcting errors in readings of electricity meters can include receiving the reading vector of the regular meters and check meters, calculating a syndrome vector of the reading vectors by multiplying the reading vectors with the decoding matrix $D=[H^T-I]^T$, using the syndrome vector to decide an error vector, and subsequently correcting the errors. However, in order to decide an error vector, in one example, the syndrome look-up tables are used as a general method of detecting and correcting the errors. In another example, a simpler algorithm that is based on majority-logic decoding was introduced in the paper, P. Hauck, M. Huber, J. Bertram, D. Brauchle, and S. Zeische, "Efficient majority-logic decoding of short-length reed-muller codes at information positions," IEEE Transactions on Communications, vol. 61, no. 3, pp. 930-938, March 2013, which is incorporated herein by reference in its entirety. This algorithm works for short length RM codes $r \leq m/2$ where systematic encoding is used.

Aspects of the disclosure provide some examples of measuring electric energy delivered in one or more cables using electricity meters, as described below.

For measuring an amount of electric energy delivered by one cable, since the first AC Kilowatt-hour electricity meter that was invented by Otto Blathy in 1889, until the development of the currently used AC Kilowatt-hour meters, the basic idea of measuring the amount of energy delivered by a cable has been to measure the voltage and the current, and to multiply them to calculate the electric energy. In case of electromechanical meters, a rotating disc with an angular speed proportional to the power is used, where the number of rotations of the disc will be proportional to the delivered energy. On the other hand, in case of electronic meters, a signal processing device is used to sample, quantize, and calculate the amount of delivered electric energy. In some cases where the load is small, i.e., residential load, the meter can be installed directly on the line connecting the source to the load, while if the load is large (usually greater than 200 Ampere), current transformers are used to measure a scaled version of the current on the cable and allow the meter to be placed in another location that might be far from the cable, e.g., a control room. A current transformer produces a reduced current accurately proportional to the current that is too high to apply directly to measuring instruments. In addition, a voltage transformer is used to measure a scaled version of the voltage. A voltage transformer produces a reduced voltage accurately proportional to the voltage that is too high to apply directly to measuring instruments. Subsequently, the meter uses these scaled versions of the current and voltage to calculate the delivered electric energy.

For measuring an amount of electric energy delivered by a group of cables fed from the same distribution node, a current transformer that surrounds the group can be used. In addition, a voltage transformer can be used on the feeder that feeds the distribution node, because all the cables have the same voltage. Specifically, in the coding scheme described above, in order to measure the electric energy delivered by different groups of cables using check meters, where some cables are members of several different groups, one group of cables can by bundled at a certain point and surrounded with a current transformer, and then another group of cables can be bundled at a different point and surrounded with another current transformer, and so on for the other groups of cables. In addition, one voltage transformer can be used to measure the voltage at the distribution node that is the same for all cables. Based on the currents and voltage measured by the current transformers and voltage transformer, amounts of electric energy delivered by different groups of cables can be computed at the check meters.

Figure 3:
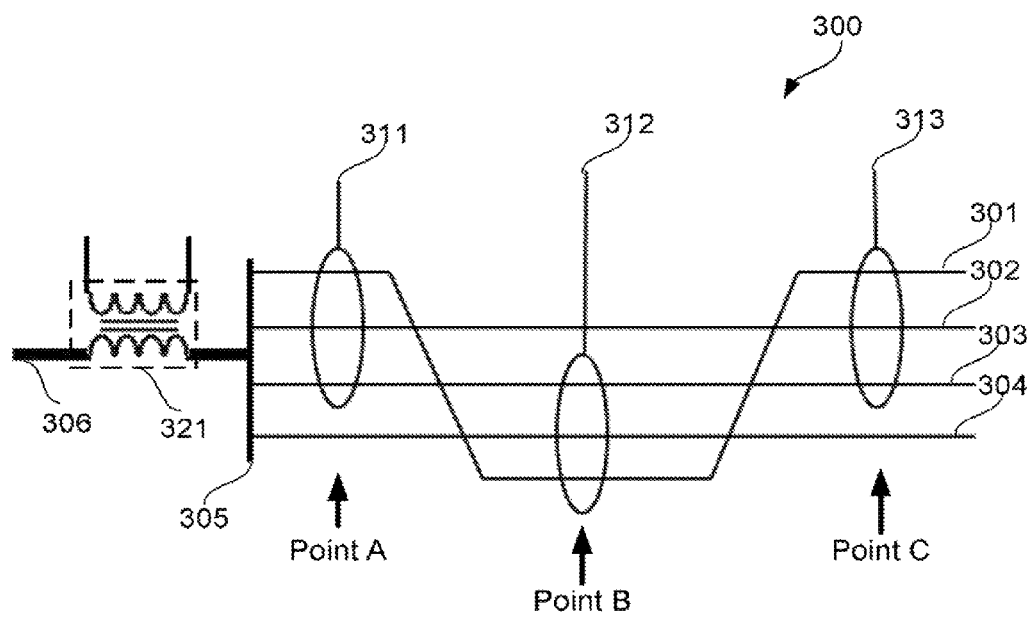
FIG. 3 shows an exemplary configuration of an electric energy transmission system for measuring electric energy delivered by different groups of cables according to some embodiments of the disclosure.

FIG. 3 shows an exemplary configuration of an electric energy transmission system 300 for measuring electric energy delivered by different groups of cables according to some embodiments of the disclosure. In the system 300, the coding scheme described above is implemented. As shown, the system 300 includes four cables 301-304 that are fed from a bus 305 at a distribution node, and a cable 306 that feeds to the bus 305. In order to measure the voltage on the cables 301-304, a voltage transformer 321 is installed on the cable 306 in the system 300 to obtain a voltage signal for voltage measurement. In addition, three current transformers 311-313 are installed at three different locations, point A, point B, and point C, to obtain signals for current measurement of different combinations of cables at different points. At different locations, the cables 301-304 are combined into different groups according to a redundant matrix in a generator matrix of a linear systematic block code used in the coding scheme. Specifically, at point A, the cables 301-303 are bundled together to form a first combination of cables that pass through the current transformer 311. At point B, the cables 301, 303, and 304 are bundled together to form a second combination of cables that pass through the current transformer 312. At point C, the cables 302-303 are bundled together to form a third combination of cables that pass through the current transformer 313.

One practical problem that might appear here is the electromagnetic interference affecting each current transformer from the cables that do not belong to the measured group by that current transformer. This electromagnetic effect might appear because of the proximity of cables at the measurement area. However, by carefully insulating the current transformers from the other cables, it is possible to avoid or reduce the effect of such interference.

Figure 4:
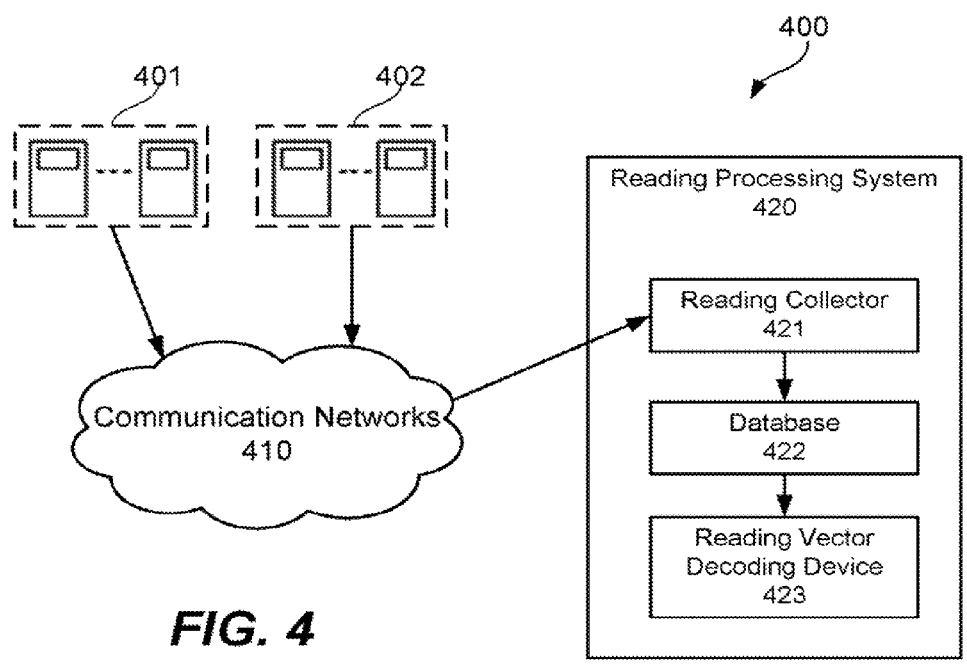
FIG. 4 shows an electricity metering system using a coding scheme according to some embodiments of the disclosure.

FIG. 4 shows an electricity metering system 400 using the coding scheme described above according to some embodiments of the disclosure. The system 400 includes a plurality of check meters 401, a plurality of regular meters 402, communication networks 410 and a reading processing system 420. The system 400 uses the coding scheme described above to detect and correct errors in the readings of electricity meters measuring electric energy delivered by cables in an electric grid, and a linear systematic code is used in the coding scheme.

The electric grid can include multiple electric energy transmission systems similar to the system 200 in FIG. 2 where a plurality of cables are fed from a same distribution node delivering electric energy to customers or other electric energy transmission systems. In these electric energy transmission systems, the check meters 401 can be installed near a distribution node and each measure a sum of energy delivered by a combination of cables. The combinations of cables are formed based on a generator matrix of the linear systematic code. In addition, in these electric energy transmission systems, regular meters can be installed to measure energy delivered by each cable at the other ends of the cables that are far from the distribution nodes but close to customer premises or other transmission systems. Readings of check meters and regular meters in a same transmission system measuring electric energy delivered during a period of time forms a reading vector.

In an embodiment, as shown in FIG. 4, the meters 401 and 402 are configured to transmit the readings to the reading processing system 420 via the communication networks 410. The meters 401 and 402 can each include communication circuitry (not shown). The communication circuitry can be configured to provide communication channels for components in the meters 401 and 402 to communicate with the communication networks 410. The communication networks 410 can include WLANs, wired-LANs, wireless cellular networks, Internet, wide-area networks, and the like. Accordingly, the communication circuitry and the communication networks 410 can operate with various communication protocols, such as WiFi, Bluetooth, Internet protocols, wireless cellular network protocols (e.g. general packet radio service (GPRS), wideband code division multiple access (WCDMA), Long-Term Evolution (LTE)), any other communication protocols, or any combination thereof.

The reading processing system 420 is configured to receive the readings of the meters 401 and 402 and decode the reading vector to detect and correct errors in the readings. The reading processing system 420 can include a reading collector 421, a database 422, and a reading vector decoding device (decoder) 423.

The reading collector 421 is configured to communicate with the check meters 401 and the regular meters 402 to receive the readings of the meters 401 and 402, and transmit the readings to the database 422. The reading collector 421 can include communication circuitry (not shown) that is configured to provide communication channels for the reading collector 421 to communicate with the communication networks 410. Accordingly, the communication circuitry in the reading collector 421 can operate with various communication protocols, such as WiFi, Bluetooth, Internet protocols, wireless cellular network protocols (e.g. GPRS), WCDMA, Long-Term Evolution (LTE), any other communication protocols, or any combination thereof.

The database 422 is configured to store the readings of the meters 401 and 402 into a memory (not shown) and transmit the readings of the meters 401 and 402 to the reading vector decoding device 423 when queried by the reading vector decoding device 423. The memory can use a variety of computer storage media in various embodiments, such as random access memory (RAM), read-only memory (ROM), electrically erasable programmable read-only memory (EEPROM), flash memory, compact disc read-only memory (CD-ROM), digital versatile disk (DVD) or other optical disk storage, magnetic disk storage, and the like.

The reading vector decoding device 423 is configured to receive readings of the meters 401 and 402 and decode the reading vector to detect and correct errors in the readings. The reading vector decoding device 423 can first receive from the database 422 the readings of the check meters 401 and regular meters 402 that are installed in a same transmission system, the readings being amounts of electric energy measured during the same time period. These received readings form the reading vector according to the coding scheme described above.

Then, the reading vector decoding device 423 can correct errors in the received readings based on a syndrome vector s of the reading vector. The syndrome vector of the reading vector can be computed using a decoding matrix D. The decoding matrix D is obtained by modifying a parity-check matrix PCH of the linear systematic block code. The decoding matrix D may be a modified decoding matrix $\tilde{D}$ in which elements in the redundant matrix of the decoding matrix D have been scaled using estimated fractions of power losses in the cables in the transmission system where the received readings are obtained. Specifically, the reading vector decoding device 423 multiplies the reading vector with the modified decoding matrix $\tilde{D}$ to compute the syndrome vector s of the reading vector. Considering power losses, if each element in the syndrome vector is equal to zero, or is in a predetermined range, the reading vector decoding device 423 determines that there is no error in the received readings; otherwise, it is determined that there is one or more errors in the received readings. The size of the predetermined range depends on the accuracy of the estimation of the power losses.

When errors are detected, the reading vector decoding device 423 can correct the errors based on the computed syndrome vector s, for example, by comparing the syndrome vector s with rows in the decoding matrix D to locate position of the error in the reading vector. In an example, an error takes place, power losses are considered, and the modified decoding matrix $\tilde{D}$ is used. The reading vector decoding device 423 compares positions of elements in the syndrome vector s that is equal to zero or in a predetermined range with the positions of zeros in each row in the decoding matrix D (not the modified decoding matrix $\tilde{D}$), position of a row whose elements with zero values have the same positions as elements with values equal or close to zero in the syndrome vector s is determined to be the position corresponding to the position of the error in the reading vector.

Subsequently, the reading vector decoding device 423 can correct the error in the reading vector based on the position determined above. The values of the elements in the syndrome vector s exclude the elements with values equal to or close to zero can be used to proximate the value of the error. Accordingly, the value of error can be subtracted from a reading with the error to obtain the true value of the reading.

As a result, the corrected readings of the regular meters can be used as billing information for charging customers, thus avoiding wrong readings of electricity meters and disputes between customers and utility companies. In addition, the reading vector decoding device 423 can generate a report indicating the errors that have been corrected. For example, the report can include an identification (ID) indicating a check meter or a regular meter that has an incorrect reading. Further, the report can include the value of the error that has been subtracted from the readings with the error. The report can include a plurality of entries each corresponding to a check meter or a regular meter having an error in its readings during a certain billing cycle. In an example, the report may be transmitted, for example, via a network, to a maintenance department in a power grid operator and maintenance staff can locate and examine the meters with incorrect readings.

In an embodiment, the reading processing system 420 is implemented as a distributed system. For example, the elements in the reading processing system 420 can be implemented separately in different computers and the elements can communicate with each other through various networks. In another embodiment, the reading processing system 420 can be integrated into one physical device, such as a computer.

In alternative embodiments, the meters 401 and 402 are configured to generate and send parameters regarding the usage of electricity, instead of readings of amounts of delivered electric energy, to the reading processing system 420. The parameters regarding the usage of electricity can be, for example, current and voltage values sampled at different time instant from the cables in an electric energy transmission system that can be used to compute amounts of energy delivered in the cables. The reading collector 421 can receive such parameters and store the parameters in the database 422. Accordingly, the reading vector decoding device 423 can be configured to first receive the parameters regarding the usage of the electricity from the database 422 and then compute readings corresponding to amounts of electric energy delivered in the cables for a period of time. These computed readings can form a reading vector used in the subsequent reading vector decoding process at the reading vector decoding device 423.

In other embodiments, the readings or parameters generated at the meters 401 and 402 can be transmitted to the reading processing system 420 using other methods different from using the communication networks 410 in FIG. 4. For example, the readings or parameters can be collected using a portable device that is taken to the vicinity of the meters 401 and 402 and stored in a storage media, such as a flash memory, connected to the portable equipment. The portable device, for example, can be any device using various Automatic Meter Reading (AMR) technologies to collect consumption data from electricity meters. Then, the storage media is connected to the reading collector 421 and the readings can be read from the storage media and stored into the database 422.

Figure 5:
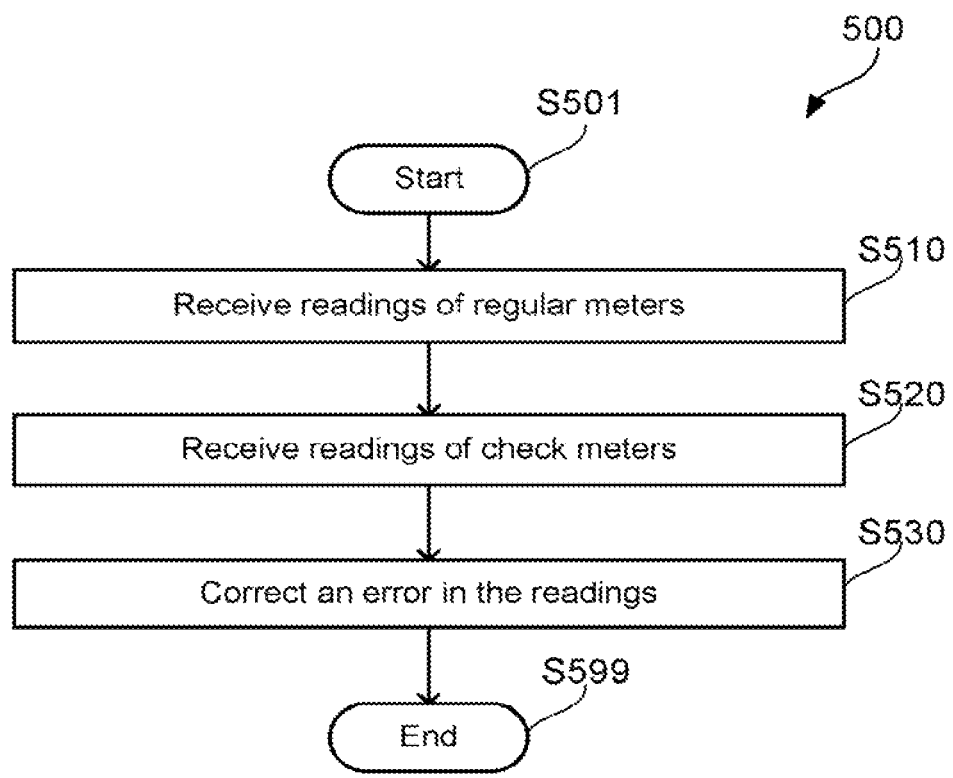
FIG. 5 shows a process for detecting and correcting errors in readings of electricity meters measuring electric energy delivered in a group of cables fed from a same distribution node in an electric grid according to an embodiment of the disclosure.

FIG. 5 shows a process 500 for detecting and correcting errors in readings of electricity meters measuring electric energy delivered in a group of cables fed from a same distribution node in an electric grid according to an embodiment of the disclosure. The process 500 uses the coding scheme described above and a linear systematic code is used in the process 500. The process starts at S501 and proceeds to S510.

At S510, readings of regular meters that measure electric energy delivered in each cable are received.

At S520, readings of check meters that each measures electric energy delivered in a combination of cables in the group of cables are received. The combinations of cables are formed based on a redundant matrix in a generator matrix of the linear systematic code.

At S530, errors in the received readings can be corrected based on a syndrome vector of a reading vector that includes the readings of the regular meters and the readings of the check meters. The syndrome vector is computed using a decoding matrix. The decoding matrix is obtained by modifying a parity-check matrix of the linear systematic code. When power losses in the cables are considered, a modified decoding matrix is used for computing the syndrome vector. Specifically, the reading vector is multiplied by the decoding matrix or the modified matrix to compute the syndrome vector. When the syndrome vector is a zero vector or values of elements in the syndrome vector are in a predetermined range, it can be determined that there is no error in the received readings; otherwise, it is determined that errors are detected in the readings of the check meters or the regular meters.

Errors in the readings can be corrected based on the computed syndrome vector. In an example, position of an error in the reading vector can be determined by comparing the syndrome vector with rows of the decoding matrix, and the values of elements in the syndrome vector that are not in the predetermined range can be used to proximate the value of the error. Subsequently, the value of the error can be subtracted from a reading with the error to obtain the true value of the reading. The process proceeds to S599 and terminates at S599.

The coding scheme, the reading processing system 420 and the process 500 described above can be implemented with any suitable software, hardware, or a hardware/software combination. In one embodiment, the coding scheme, the reading processing system 420 and the process 500 can be implemented as an application program comprised of computer-executable instructions that can be stored in a computer-readable media and can run on one or more computers. In one embodiment, the coding scheme, the reading processing system 420 and the process 500 can be implemented in combination with other programs, such as operating systems and program modules of other applications, or can be implemented as a combination of hardware and software.

Each of the functions of the described embodiments including the reading vector decoding device 423 may be implemented by one or more processing circuits. A processing circuit includes a programmed processor as a processor includes circuitry. A processing circuit may also include devices such as an application specific integrated circuit (ASIC) and conventional circuit components arranged to perform the recited functions.

In addition, the coding scheme, the reading processing system 420 and the process 500 described above can be implemented with various suitable computer system configurations, such as single-processor or multiprocessor computer systems, minicomputers, mainframe computers, as well as personal computers, hand-held computing devices, microprocessor-based or programmable consumer electronics, and the like.

Further, the coding scheme, the reading processing system 420 and the process 500 described above can also be implemented in distributed computing environments. In a distributed computing environment, program modules can be located in both local and remote memory storage devices, and certain functions can be performed by remote processing devices that are linked to local processing devices through a communications network.

Still further, information such as computer-readable instructions, data structures, program modules or other data can be stored in a variety of computer storage media, such as random access memory (RAM), read-only memory (ROM), electrically erasable programmable read-only memory (EEPROM), flash memory, compact disc read-only memory (CD-ROM), digital versatile disk (DVD) or other optical disk storage, magnetic cassettes, magnetic tape, magnetic disk storage, and the like.

Figure 6:
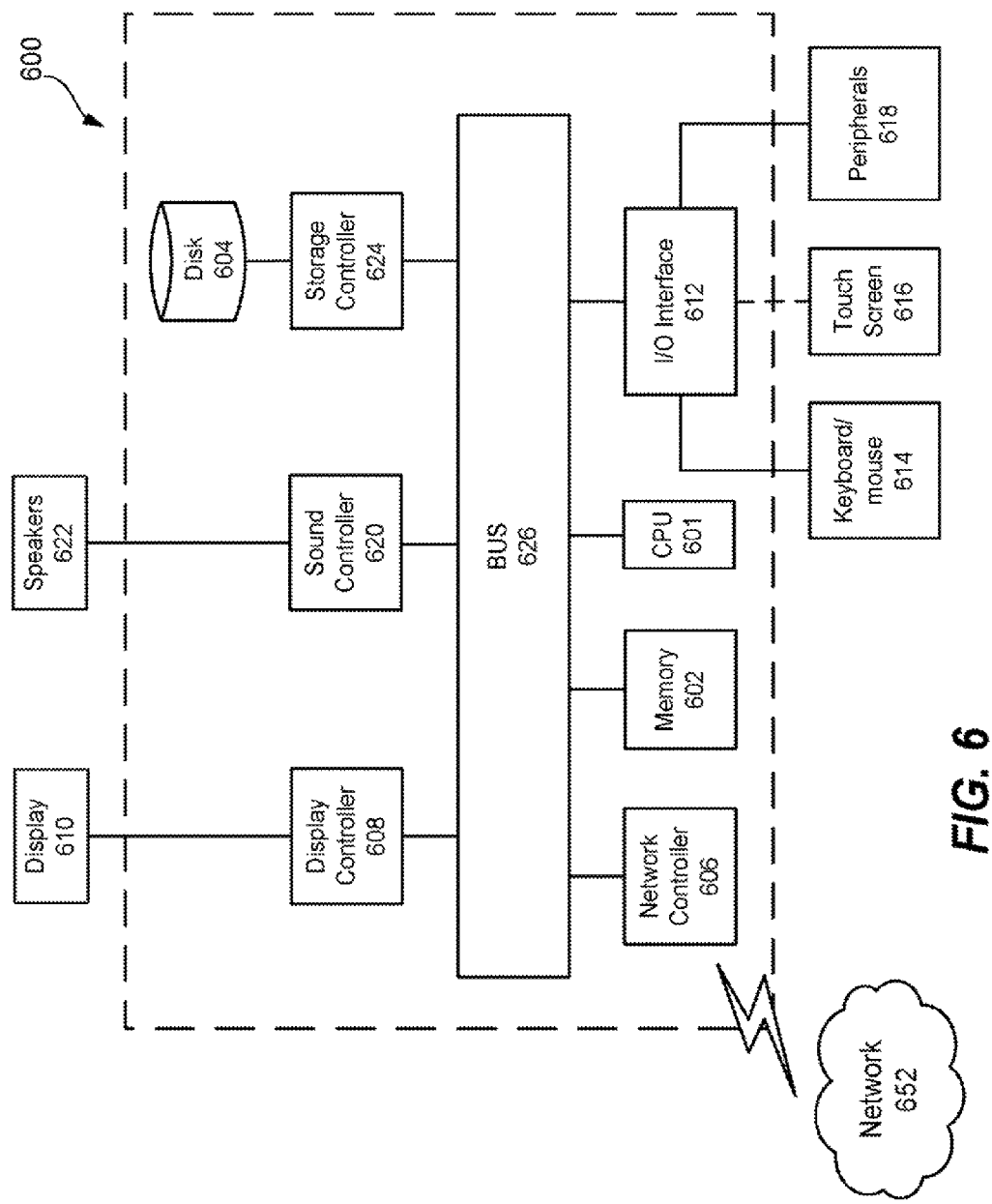
FIG. 6 shows an exemplary computer for implementing various aspects of the disclosure according to some embodiments of the disclosure.

FIG. 6 shows an exemplary computer 600 for implementing some or all of the aspects of the disclosure including the coding scheme, the reading processing system 420, and the process 500 described above according to some embodiments of the disclosure. In FIG. 6, the computer 600 includes a central processing unit CPU 601 which may be part of the circuitry for implementing the reading vector decoding device 423 of FIG. 4 and can perform the operations and processes described above. The data and instructions may be stored in a memory 602. These data and instructions may also be stored on a storage medium disk 604 such as a hard drive (HDD) or portable storage medium or may be stored remotely. Further, the aspects of the disclosure are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 600 communicates, such as a server or computer.

Further, the aspects of the disclosure may be provided as a utility application, background daemon, or component of an operating system, or combination thereof, executing in conjunction with CPU 601 and an operating system such as Microsoft Windows 7, UNIX, Solaris, LINUX, Apple MAC-OS and other systems known to those skilled in the art.

The hardware elements of the computer 600 may be realized by various circuitry elements, known to those skilled in the art. For example, CPU 601 may be a Xenon or Core processor from Intel of America or an Opteron processor from AMD of America, or may be other processor types that would be recognized by one of ordinary skill in the art. Alternatively, the CPU 601 may be implemented on an FPGA, ASIC, PLD or using discrete logic circuits, as one of ordinary skill in the art would recognize. Further, CPU 601 may be implemented as multiple processors cooperatively working in parallel to perform the instructions of the inventive processes described above.

The computer 600 in FIG. 6 also includes a network controller 606, such as an Intel Ethernet PRO network interface card from Intel Corporation of America, for interfacing with network 652. As can be appreciated, the network 652 can be a public network, such as the Internet, or a private network such as an LAN or WAN network, or any combination thereof and can also include PSTN or ISDN sub-networks. The network 652 can also be wired, such as an Ethernet network, or can be wireless such as a cellular network including EDGE, 3G and 4G wireless cellular systems. The wireless network can also be WiFi, Bluetooth, or any other wireless form of communication that is known. The computer 600 can communicate to one or more remote computers, such as a server computer, a router, a personal computer, portable computer, microprocessor-based entertainment appliance, a peer device or other common network node.

The computer 600 further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computer 600, such as Sound Blaster X-Fi Titanium from Creative, to interface with speakers/microphone 622 thereby providing sounds and/or audio.

The general purpose storage controller 624 connects the storage medium disk 604 with communication bus 626, which may be an ISA, EISA, VESA, PCI, or similar, for interconnecting all of the components of the computer 600. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chip.

Figure 7:
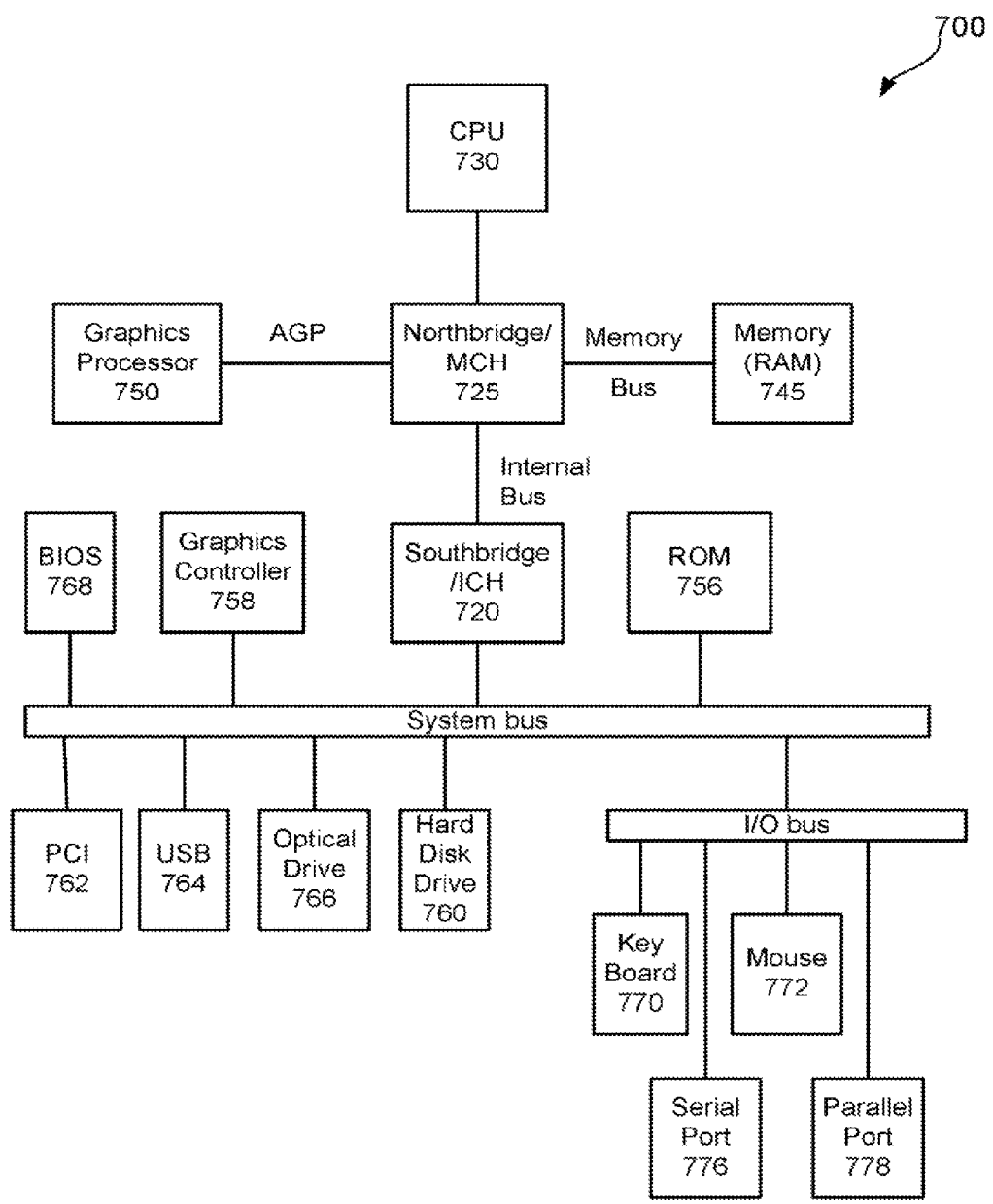
FIG. 7 shows an exemplary data processing system for implementing various aspects of the disclosure according to some embodiments of the disclosure.

FIG. 7 shows an exemplary data processing system 700, according to certain embodiments, for implementing some or all of the aspects of the disclosure including the coding scheme, the reading processing system 420, and the process 500 described above. The data processing system 700 is an example of a computer in which specific code or instructions implementing the processes of the illustrative embodiments may be located to create a particular machine for implementing the above-noted process.

In FIG. 7, data processing system 700 employs a hub architecture including a north bridge and memory controller hub (NB/MCH) 725 and a south bridge and input/output (I/O) controller hub (SB/ICH) 720. The data processing system 700 includes a central processing unit (CPU) 730 that is connected to NB/MCH 725. The CPU 730 may be part of the circuitry for implementing the reading vector decoding device 423 of FIG. 4 and performs the functions and processes described above. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU 730 may contain one or more processors and even may be implemented using one or more heterogeneous processor systems.

Figure 8:
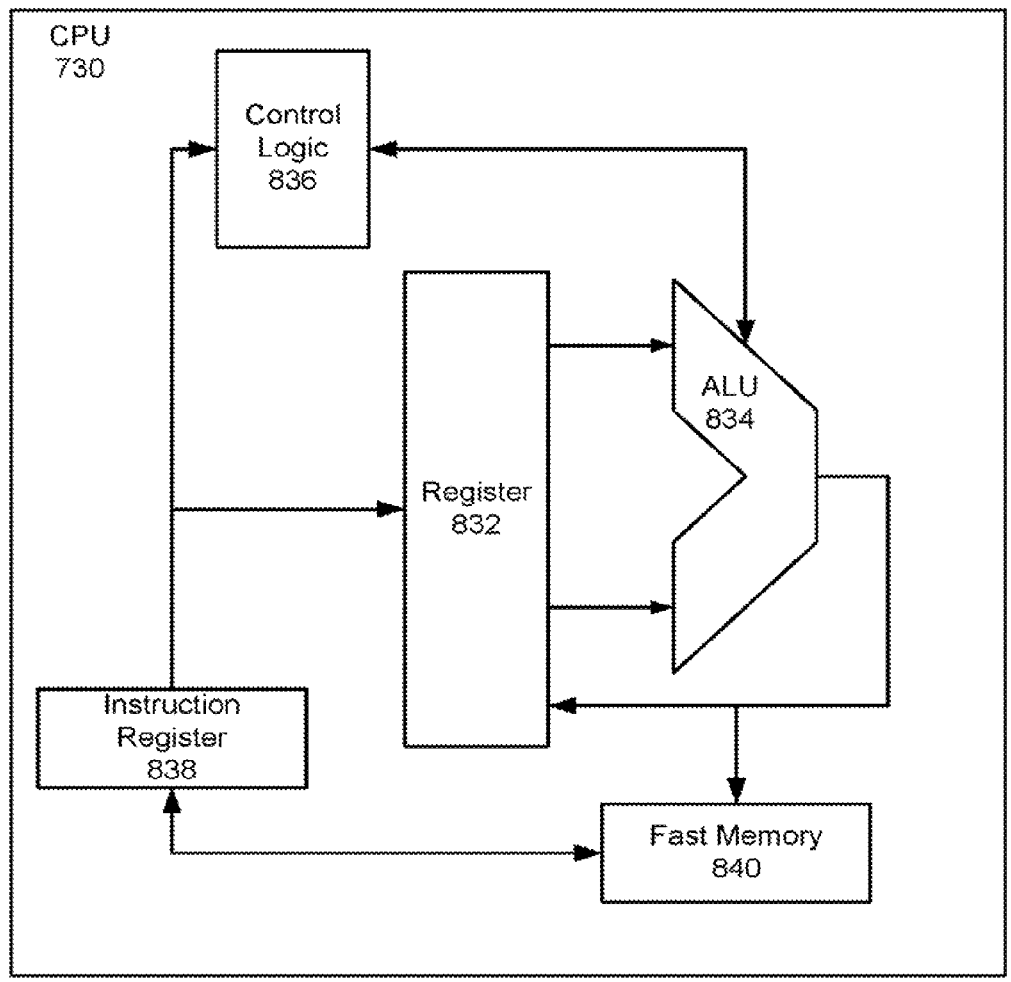
FIG. 8 shows an exemplary implementation of a CPU according to an embodiment of the disclosure.

For example, FIG. 8 shows an exemplary implementation of CPU 730 according to an embodiment of the disclosure. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation, the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 6, 7, or 8, constitutes or includes specialized corresponding structure that is programmed or configured to perform the functions and processes described in FIGS. 2-5.

It is noted that although examples described above refer to Hamming code that is capable of correcting an error in code words for data transmission, the aspects of the disclosure are not limited to correcting an error of the reading vectors of the electricity meters. Other linear systematic block codes, such as Reed-Muller code capable of detecting and correcting multiple errors in code words for data transmissions can be used for detecting and correcting multiple errors in the reading vectors of the electricity meters.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for correcting electricity meter readings, comprising:
receiving first readings of regular meters measuring electric energy delivered in each of a group of cables fed from a same distribution node delivering electric energy to one or more electric energy transmission systems in an electric grid comprising multiple electric energy transmission systems during a period of time;
receiving second readings of check meters measuring electric energy delivered in each of combinations of cables in the group of cables during the period of time, the combinations of cables being formed based on a redundant matrix in a generator matrix of a linear systematic block code; and
correcting, in response to determining that at least one error has been detected, the at least one error in the first readings of the regular meters and the second readings of the check meters based on a syndrome vector of a reading vector that includes the first readings of the regular meters and the second readings of the check meters, the syndrome vector of the reading vector being computed using a decoding matrix that is obtained by modifying a parity-check matrix of the linear systematic block code.

2. The method of claim 1, wherein
the first readings of the regular meters correspond to parameters regarding usage of the electric energy delivered in each of the group of cables during the period of time, and
the second readings of the check meters correspond to parameters regarding usage of the electric energy delivered in each of combinations of cables in the group of cables during the period of time.

3. The method of claim 1, wherein the syndrome vector of the reading vector is computed by multiplying the reading vector with the decoding matrix.

4. The method of claim 1, wherein modifying the parity-check matrix includes multiplying elements of an identity matrix in the parity-check matrix with −1.

5. The method of claim 1, wherein the decoding matrix is a modified decoding matrix, and modifying the parity-check matrix includes
multiplying an element of an identity matrix in the parity-check matrix with −1, and
scaling an element of the redundant matrix in the parity-check matrix using an estimated fraction of power loss in one of the group of cables with respect to total electric energy delivered in the one cable.

6. The method of claim 5, further comprising:
determining that no error has been detected when values of elements of the syndrome vector are within a predetermined range, the predetermined range being determined based on accuracy of estimation of the power losses on the group of cables.

7. The method of claim 6, wherein the correcting of the at least one error in the first readings of the regular meters and the second readings of the check meters based on the syndrome vector of a reading vector includes
- comparing the syndrome vector with rows in the decoding matrix to determine a position of a reading with the at least one error in the reading vector, and
- subtracting a value of the at least one error from the reading with the at least one error, the value of the at least one error being approximated using a value of an element in the syndrome vector that is not in the predetermined range.

8. The method of claim 1, wherein each of the combinations of cables corresponds to a column of the redundant matrix, each element in the column corresponding to one of the group of cables, and each of the combinations of cables includes cables corresponding to non-zero elements in the column of the redundant matrix.

9. The method of claim 1, wherein the linear systematic block code is one of the following codes: (1) Golay Code; (2) Reed-Muller code; (3) Hamming code.

* * * * *